Jan. 12, 1960 W. P. WILSON 2,920,635
SLURRY REMOVAL SYSTEM
Filed June 5, 1957
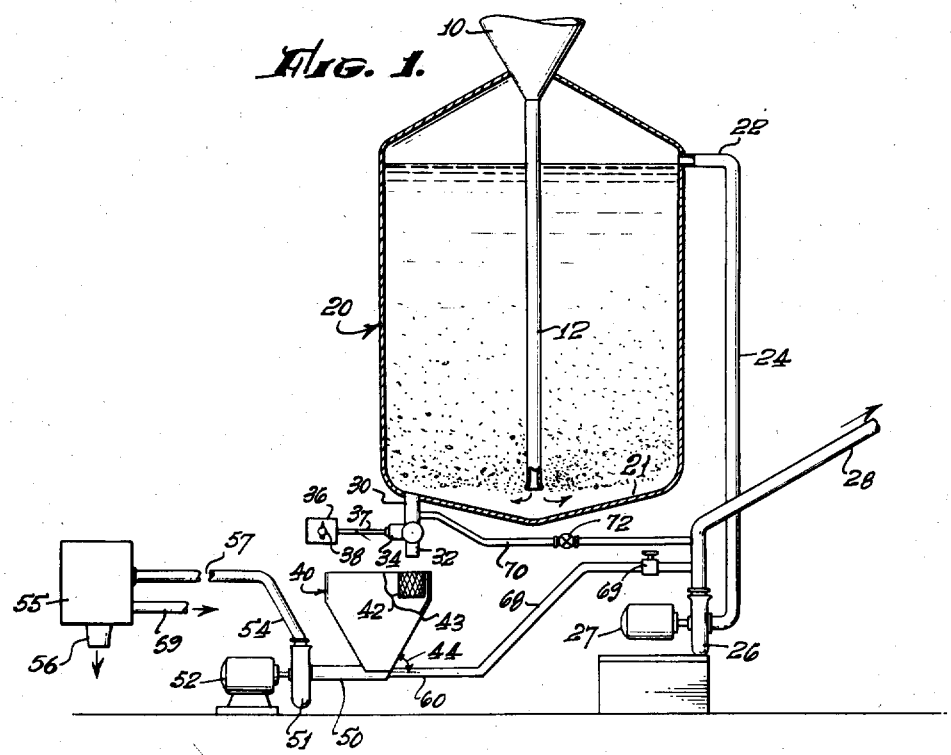
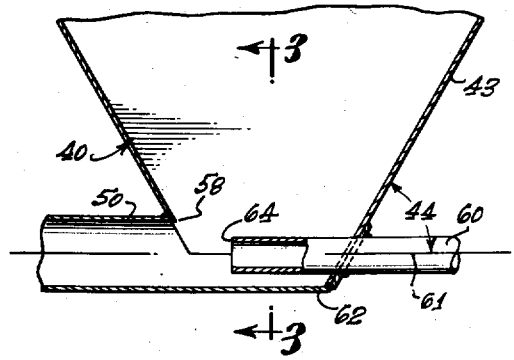
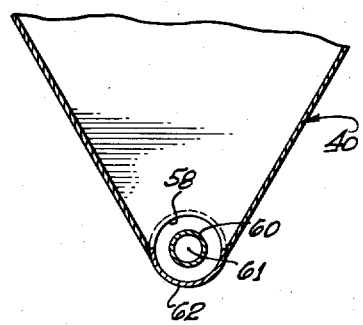
WILLIAM PAGE WILSON,
INVENTOR.
By Barkelew & Lewis

United States Patent Office 2,920,635
Patented Jan. 12, 1960

2,920,635

SLURRY REMOVAL SYSTEM

William Page Wilson, Carlsbad, N. Mex., assignor to United States Borax & Chemical Corporation, Los Angeles, Calif., a corporation of Nevada Application June 5, 1957, Serial No. 663,833

3 Claims. (Cl. 137—15)

This invention relates to methods and apparatus for handling a heavy slurry in which the solid particles tend to settle rapidly.

More particularly, the invention provides improved means for removing such a slurry at a controlled average rate from a vessel in which it is contained.

The invention relates especially to suspensions of relatively large solid particles which have a correspondingly high settling rate. Such dense slurries of coarse particles can be held in suspension in a suspension vessel by agitation, for example, but settle rapidly whenever movement is arrested.

For control purposes it is often desirable to draw off such suspensions from the vessel through a passage containing a control valve. However, it is difficult to prevent the passage, and especially the valve, from becoming plugged by settling of the slurry particles whenever outward flow is interrupted.

A primary object of the invention is to avoid such valve stoppage without excessive consumption of power or of suspending liquid. That is accomplished in accordance with one aspect of my invention by backwashing the slurry outlet between the valve and the suspension vessel when the valve is closed. Not only does such backwashing of the outlet line prevent clogging of the valve, but I have discovered that it can be accomplished by a rate of liquid flow into the line which does not appreciably impede the outflow of slurry when the valve is open.

A further aspect of the invention relates to improved means for handling a heavy slurry which is downwardly delivered from a discharge opening, particularly when such delivery is intermittent.

A full understanding of the invention and of its further objects and advantages will be had from the following description of an illustrative manner of carrying it out. That description, including the accompanying drawing which forms a part of it, is presented only as illustration, and its particulars are not intended as a limitation upon the scope of the invention, which is defined in the appended claims.

In the drawings:

Fig. 1 is a schematic diagram representing illustrative apparatus for carrying out the invention;

Fig. 2 is a section corresponding to a portion of Fig. 1 at enlarged scale; and

Fig. 3 is a section on line 3—3 of Fig. 2.

The invention is particularly useful in connection with the controlled removal of a heavy suspension of coarse salt crystals from a suspension vessel in which it is contained, and in which it may, for example, have been formed by crystallization of the salt from a saturated or supersaturated brine. For clarity of explanation, the invention will be described primarily as it relates to that type of operation, but without thereby implying any limitation as to the nature or source of the slurry to be handled.

In crystallizing a salt, such as potassium chloride, for example, from a hot saturated solution, the solution is typically cooled and concentrated in known manner in a vaporiser, represented in fragmentary form at 10. The resulting saturated or supersaturated solution is transferred to a relatively large generally cylindrical suspension vessel, represented at 20, in which crystallization takes place. Although the solution may contain other solutes, for example sodium chloride, the concentration of such additional solutes is generally maintained below saturation, so that only the desired product precipitates. The resulting salt crystals in the lower portion of suspension vessel 20 are typically held in suspension as a teeter bed by the velocity of the entering brine, which is introduced axially through the down draft tube 12 directly against the slightly conical bottom 21 of the vessel. In typical operation, the crystals grow progressively in size until removed, forming a thick slurry which is difficult to handle by previously available methods and apparatus.

The solution in the upper portion of the suspension vessel is relatively static, permitting crystals to settle out as the solution rises in the vessel. Barren solution overflows from the top of vessel 20, as via the overflow indicated at 22, and is delivered by the overflow line 24 to a return pump 26. Return pump 26 is driven by the motor 27, and typically maintains an appreciable and substantially uniform pressure in return line 28, through which most of the solution is typically returned to the system as recycled mother liquor.

In the present embodiment, the slurry of salt crystals is removed from the lower portion of suspension vessel 20 via the outlet pipe 30. That outlet pipe leads vertically downward from near the outer edge of vessel bottom 21, where the slurry density has approximately its maximum value. Flow through outlet pipe 30 is controlled by a metering valve 34 in such a way as to maintain the desired slurry density in the suspension vessel. Valve 34, which may be of any suitable type, is typically a pneumatically operated plug valve which is shiftable between open and closed positions. Open position of the valve provides an aperture to the out-flowing slurry that is wide enough to avoid stoppage by the crystals or by the occasional lumps of crystals, some of which may be quite large. The rate of flow with the valve open is therefore typically much higher than the desired average rate of slurry removal. Consequently the valve is typical closed for as much as 80% of the time. The valve may be controlled manually, but is preferably controlled by automatic timing means. The timer cycle may be then varied manually, for example, in accordance with the existing slurry density. A timing control device, which may be of conventional type, is indicated schematically at 36, connected to valve 34 by the pneumatic line 37. Timing device 36 causes the valve to open periodically at a suitable frequency, such as four cycles per minute, for example, which is high enough to give effectively steady flow at the equipment which utilizes the slurry. The ratio of open time to closed time for the valve is typically approximately one to four. That ratio is preferably variable, as by a handle 38, and may be adjusted to draw out the heavy slurry at an average rate such that the slurry density in suspension vessel 20 maintains a desired value.

Out-flowing slurry is delivered via an outflow pipe 32 into a receiver tank 40. A lump catching basket 42 is preferably provided below the outlet from pipe 32, and has a mesh size large enough to pass all solids of the slurry except the abnormally large lumps which might cause stoppage of the remaining parts of the system. Receiver tank 40 has typically an open top and steeply sloping sides of conical or pyramidal form which lead to a central outlet at the bottom. I have found that the side wall 43 upon which the slurry impinges should have a slope angle with respect to the horizontal, indicated at 44, of approximately 60°, so that the incident crystals will slide down to the delivery apex of the tank without building up at the point of impact. Tank 40 delivers the slurry to the delivery pipe 50 which leads directly to the intake of delivery pump 51. Pump 51 is driven by the motor 52 which delivers the slurry via the line 54 to any desired destination. That destination may typically comprise a suitable filter or centrifuge for separating the crystals from the suspending liquid. Such a centrifuge is indicated schematically at 55, and may be located at any convenient distance from the crystallizing apparatus, as indicated by the break 57 in delivery line 54. Centrifuge 55 typically delivers the salt crystals as a recovered product at 56, and delivers the suspending solution via a line 59, which may, for example, be connected to the inlet of return pump 26, so that the solution is returned to the overall system via line 28.

In accordance with one aspect of the present invention, the slurry is removed from receiver tank 40 with the aid of a jet of liquid which traverses at least a part of the delivery portion of the tank and with which delivery pipe 50 is axially aligned. Such a jet performs at least three important functions. It breaks up accumulations of solids at the delivery apex of receiver tank 40 and prevents the plugging of line 50 to pump 51 by the heavy surge of crystals during the dumping phase of the valve cycle. The jet also maintains liquid in the pump and prevents air lock during the light pumping duty, as when outlet control valve 34 is closed. And the jet liquid dilutes the heavy slurry and greatly facilitates its further handling, typically represented in the present embodiment by the action of pump 51 in delivering the slurry to its destination 55.

Suitable jet action of the diluting liquid supplied to the delivery portion of receiver tank 40 may be obtained by a wide variety of detailed structures. As illustratively shown, especially in Figs. 2 and 3, the jet liquid is supplied via the horizontal jet pipe 60 which is aligned with delivery pipe 50, already described, on the axis 61. The extreme bottom of the tank, at the apex of the inverted cone or pyramid, is preferably of cylindrical form and coaxial with the jet axis 61. For example, the tank apex may be formed by lower half 62 of an end section of delivery pipe 50, the upper half of which has been cut away. Jet supply pipe 60 is preferably of considerably smaller diameter than delivery pipe 50, and extends axially part way across the tank bottom in spaced relation to the pipe wall 62. The jet-forming outlet 64 of pipe 60 is spaced from the effective inlet of delivery pipe 50, indicated at 58, and delivers the jet stream directly into the latter. A constricted jet nozzle may be provided at the open end 64 of pipe 60 if desired. However, sufficiently strong jet action is ordinarily obtainable by utilizing the open end of the pipe as a jet nozzle.

When the solid component of the slurry comprises salt crystals that are to be recovered, as in the present embodiment, the diluting liquid employed for the jet stream at 64 is preferably a solution saturated with respect to the salt in question. Such a solution may conveniently be obtained in the present instance from solution return line 28, in which a pressure of 20 to 30 pounds per square inch is typically maintained by return pump 27. A connecting line 68 is shown for that purpose, with a control valve 69 for regulation of the amount of barren solution delivered to the jet.

The most economical and effective rate of flow at jet aperture 64 depends upon many features of the system, such as the scale and the particular structure of the apparatus and the nature of the slurry to be handled. As an illustration of effective operation, I have found that a system of the described type is highly successful with the following approximate relationships; discharge valve 34 delivers slurry at 250 gallons per minute during its open phase. Timer 36 typically operates valve 34 on a cycle which is adjustable at least between an open ratio of 1/5 of the time for handling a very heavy slurry and an open ratio of 3/5 of the time for handling a relatively light slurry, thus giving an average rate of slurry delivery from about 50 to about 150 gallons per minute.

Pump 51 has a capacity substantially equal to the open-valve slurry delivery rate, or 250 gallons per minute. The jet at 64 is operated continuously at a flow rate approximately one third the pump capacity, or about 80 gallons per minute. With those illustrative conditions of operation the slurry tends to accumulate in receiver tank 40 during open periods of valve 34, and is effectively removed with the aid of the described jet action during closed periods of the valve. The surges of slurry delivered to receiver tank 40 by the intermittent operation of valve 34 are thus transformed into a relatively uniform delivery of diluted slurry by pump 51.

The slurry removal system as thus far described is in many respects more convenient and economical than the commonly used systems which utilize a loop of relatively large pipe through which slurry is directly circulated from suspension vessel 20 at a rate sufficient to prevent the solids from settling out and plugging the loop. Such a loop must extend all the way to the destination of the slurry, typified by the centrifuge 55, which may be several hundred feet from suspension tank 20. Excessive power is required to maintain flow of the heavy slurry at high velocity through such a loop, and the rapidly moving magma erodes the pump and the pipe at an excessive rate. At best, such a system maintains free flow through the loop only during continuous operation, and during even a momentary interruption in the flow the crystals tend to settle out and plug the line. Also, it is difficult to prevent stoppage of such a loop by the lumps of salt crystals that occur occasionally in vessel 20. Screens placed within that vessel to catch such lumps build up with salt, and the vessel must be drained to remove the screens for cleaning. A circulating pump large enough to pass the bigger lumps is necessarily a large pump, requiring additional power for its operation.

The improved type of system described above avoids most of those difficulties. The power requirements for slurry delivery pump 51 are relatively modest, since the amount of slurry which it handles is only that to be disposed of, in contrast to the recirculating loop. Also, the pumped slurry has been diluted with solution to a concentration that flows readily through line 54. The pump is not required to handle large lumps of salt, which are removed by the conveniently accessible basket 42.

However, the improved type of system, as so far described, is subject to the disadvantage that control valve 34 tends to become plugged. During the closed phase of the valve operation the solids suspended within outlet pipe 30 tend to settle downward upon the face of valve 34. That tendency is increased when the operating cycle of the valve includes a relatively long closed time, which is usually the case, for the reasons already described.

One aspect of the present invention provides a very effective and economical solution of that problem, thereby permitting the described type of slurry removal system to be employed conveniently and reliably even with very heavy slurries, such as the present illustrative type. That is accomplished by feeding a liquid into outlet pipe 30, as via the line 70, between vessel 20 and control valve 34 at such a rate as to backwash the slurry upward in the pipe into vessel 20. Settling of the solid component of the slurry in the pipe during closed periods of valve 34 is thereby prevented. I have discovered that it is feasible in actual practice to introduce a clearing stream of liquid into pipe 30 continuously at a rate that will provide such backwashing action during valve closure without interfering appreciably with the downward flow of the slurry from vessel 20 when valve 34 is open. It is therefore not necessary to provide means for producing intermittent flow of the clearing liquid. In fact, it is ordinarily preferable to maintain that flow during open as well as closed periods of valve 34, since the slight dilution of the outflowing slurry that is so produced aids its further handling and reduces the amount of diluting liquid required to be supplied at jet 64.

The clearing liquid is preferably introduced into outlet pipe 30 at a point closely adjacent valve 34, as indicated in the drawing by the position of line 70. In the present embodiment the clearing liquid is preferably substantially saturated with respect to the salt which is being crystallized in suspension vessel 20. I have found it particularly advantageous to utilize for that purpose the overflow solution. That solution is conveniently obtainable directly from return line 28, in which the pressure is typically well above the hydrostatic pressure at the bottom of vessel 20. Thus, in the present embodiment of the invention, the inlet end of clearing line 70 is connected directly to solution return line 28. A valve 72 is preferably provided in line 70 for manually regulating the rate of flow of the clearing solution to pipe 30.

That rate of flow should be at least sufficient to prevent downward settling of crystals within outlet pipe 30 when control valve 34 is closed. Such settling is prevented, for example, by a rate of upward flow in pipe 30 which is at least slightly greater than the maximum settling rate of the normal solids in the slurry. For example, if the largest crystals normally encountered in the slurry have a settling rate of about 0.4 foot per second, and if outlet pipe 30 has an internal diameter of about 4 inches, approximately 20 gallons per minute of clearing solution will be sufficient to prevent settling of such crystals in the pipe during valve closure. That rate of flow does not, however, appreciably affect the rapidly agitated slurry within vessel 20, which is typically ten to twenty feet in diameter. And, when valve 34 is open, the clearing liquid, even if operated on a continuous basis, does not appreciably impede the outflowing slurry, which typically flows at a rate approximating 250 gallons per minute.

The following example is illustrative of the great economy and convenience provided by the invention. It was desired to remove from a suspension vessel about 18 feet in diameter about 50 gallons per minute of a heavy slurry comprising about 90% by volume of crystals of potassium chloride of a mesh size predominantly between 8 mesh and 20 mesh suspended in a solution substantially saturated in potassium chloride and sodium chloride. The slurry was to be delivered to a destination several hundred feet from the suspension vessel. Operation of a conventional slurry removal system of loop type required pumping 350 gallons per minute of the heavy slurry through a 4 inch pipe against a head pressure of 180 feet of water. The power requirement for such a system was about 60 horsepower. On the other hand, with the system herein described, 50 gallons per minute of heavy slurry were delivered through the control valve 34 to receiving tank 40, and were diluted by action of the clearing stream from pipe 70 and the jet stream at 64 to about 150 gallons per minute. That diluted slurry could be pumped the same distance through a 3 inch line with a head of only 80 feet of water, requiring about 15 horsepower.

Actually, with the loop system it was difficult to draw off the required 50 gallons per minute of slurry from the end of the loop, since the high pressure developed to carry the slurry through the loop made it necessary to employ a small outlet opening, which repeatedly became plugged. A large amount of water had to be added to the system in the process of clearing that opening, seriously reducing the production of the overall equipment.

With the presently described slurry removal system, control valve 34 could readily be kept clear under all normal operating conditions by use of an amount of clearing solution so small as to have no appreciable effect upon the system as a whole. The solution employed to dilute the slurry to facilitate its handling can readily be returned to the system, as already explained, and hence does not interfere with operation of the system as a whole.

I claim:
1. A system for removing from a vessel at a predetermined average rate a heavy slurry comprising solid particles having respective settling rates that are predominantly less than a predetermined value, said system comprising the combination of structure forming an outlet passage leading downward from the vessel, valve means in the outlet passage, valve actuating means for periodically shifting the valve between open and closed positions with a definite ratio of open time to closed time to remove slurry from the tank intermittently at said average rate, structure forming a clearing passage which empties into the outlet passage immediately above the valve means, and means for supplying liquid continuously through the clearing passage to the outlet passage at a rate which produces, when the valve means is closed, upward flow in the outlet passage at a rate greater than said settling rate value, and which, when the valve means is open, is insufficient to impede outflow of the slurry.

2. The method of removing a heavy slurry at a predetermined average rate from a slurry-containing vessel having an outlet pipe leading downward therefrom, said method comprising periodically opening a valve in said pipe to release slurry intermittently through said downwardly extending pipe from the vessel, injecting continuously into the pipe immediately above the valve a slurry-free liquid at a rate which, during periods of valve closure, produces an upward flow in the pipe greater than the settling rate of the slurry solids and which, during periods when the valve is open, is insufficient to impede outflow of the slurry, and regulating the ratio of open time to closed time of the valve to produce said average rate of slurry removal.

3. A system for removing a heavy slurry comprising solid particles having respective settling rates that are predominantly less than a predetermined value, at a predetermined average rate from a slurry-containing vessel, said system comprising the combination of structure forming an outlet passage leading downward from the vessel and having a discharge opening, valve means in the outlet passage, structure forming a clearing passage which empties into the outlet passage immediately above said valve means, means for supplying liquid continuously through the clearing passage to the outlet passage at a rate which produces, when the valve means is closed, upward flow in the outlet passage at a rate greater than said settling rate value, and which, when the valve is open, is insufficient to impede outflow of the slurry, a receiver tank having a side wall which is spaced below the discharge opening in the path of discharge therefrom and which slopes downward to a tank outlet at an angle of at least 60° with respect to the horizontal, valve actuating means for periodically shifting the valve between open and closed positions with a definite ratio of open time to closed time to deposit slurry intermittently on said tank wall at said average rate, structure forming a fluid conduit leading transversely from the tank outlet, pump means for removing fluid from said conduit, a jet nozzle at the tank outlet directed coaxially into the conduit, means for delivering liquid continuously to the jet nozzle to produce a jet stream which, when the valve is open, dilutes the slurry and delivers the diluted slurry to the pump, and which, when the valve is closed, maintains continuous supply of fluid to the pump.

References Cited in the file of this patent

UNITED STATES PATENTS

| | | |
|---|---|---|
| 1,000,689 | Paterson | Aug. 15, 1911 |
| 1,160,848 | Conklin | Nov. 16, 1915 |
| 1,833,390 | Carter | Nov. 24, 1931 |
| 2,265,225 | Clark | Dec. 9, 1941 |
| 2,337,260 | McBain | Dec. 21, 1943 |
| 2,631,926 | Eckstrom | Mar. 17, 1953 |